United States Patent
Helmer

(10) Patent No.: US 9,244,627 B2
(45) Date of Patent: Jan. 26, 2016

(54) SECURE DATA ERASURE SYSTEM FOR ERASING A PLURALITY OF DATA STORAGE DEVICES

(71) Applicant: Synetic Technologies, inc., North Kansas City, MO (US)

(72) Inventor: Ronald Walter Helmer, Platte City, MO (US)

(73) Assignee: Synetic Technologies, Inc., North Kansas City, MO (US)

( * ) Notice: Subject to any disclaimer, the term of this patent is extended or adjusted under 35 U.S.C. 154(b) by 193 days.

(21) Appl. No.: 14/054,337

(22) Filed: Oct. 15, 2013

(65) Prior Publication Data

US 2015/0106562 A1    Apr. 16, 2015

(51) Int. Cl.
*G06F 3/06* (2006.01)

(52) U.S. Cl.
CPC ............ *G06F 3/0652* (2013.01); *G06F 3/0623* (2013.01); *G06F 3/0689* (2013.01); *G06F 2003/0692* (2013.01)

(58) Field of Classification Search
None
See application file for complete search history.

(56) References Cited

U.S. PATENT DOCUMENTS

| | | | |
|---|---|---|---|
| 2006/0117393 A1* | 6/2006 | Merry et al. | 726/34 |
| 2007/0101055 A1* | 5/2007 | Thorsen | 711/112 |
| 2007/0180211 A1* | 8/2007 | Takaoka et al. | 711/170 |
| 2012/0278564 A1* | 11/2012 | Goss et al. | 711/155 |

OTHER PUBLICATIONS

Blancco; Blancco 4 Technical Specification; Report Date: Sep. 2, 2009; http://download.blancco.com/Marketing/Material/Tech_Client/Technical_specification_Clients_4.10_EN.pdf.*
Kissel; Richard et al. Guidelines for Media Sanitization, Revision 1; Sep. 2012; http://www.destructdata.com/s/nist-sp-800-88-revl.pdf.*
"DoD Information Security Program: Protection of Classified Information"; Department of Defense Manual 5200.01 vol. 3; Mar. 19, 2013; http://www.dtic.mil/whs/directives/corres/pdf/520001_vol3.pdf.*
O'Reilly and Associates; Device Files (Running Linux); 2001; http://docstore.mik.ua/orelly/linux/run/ch06_03.htm.*
Website; Darik's Boot and Nuke/ Hard Drive Disk Wipe and Data Clearing; http://www.dban.org/; Publication date: Nov. 17, 2012.

* cited by examiner

*Primary Examiner* — Reginald Bragdon
*Assistant Examiner* — Edward Wang
(74) *Attorney, Agent, or Firm* — Hovey Williams LLP

(57) ABSTRACT

An erasure system and method for sorting, tracking, and erasing a plurality of data storage devices using enterprise hardware and software designed for data storage. The erasure system may include a server, drive arrays having receptacles for communicably coupling with the data storage devices, and a drive array controller configured for communicably coupling the server with the drive arrays. The server may receive specification information regarding each of the drive arrays and each of the data storage devices in the receptacles of the drive arrays for erasure and logging purposes. Then the server may overwrite each of the data storage devices according to the DoD 5220.22-M standard, thereby erasing the data storage devices. The server may also create log files corresponding to each of the data storage devices, including information like time, date, and if the erasure of the data storage device is complete or has failed.

16 Claims, 5 Drawing Sheets

\* Successful Log:

Fri Feb 15 15:22:33 CST 2013 - Log file created
Drive Serial Number: KRVN0AZBGMPRSJ
Device Name: /dev/cciss/c0d12
Physical Drive: 1:11
Drive located on Controller P9B280GMQSJ57F Disk /dev/cciss/c0d12: 500.0 GB, 500074307584 bytes
255 heads, 32 sectors/track, 119694 cylinders
Units = cylinders of 8160 * 512 = 4177920 bytes

==========================================

Fri Feb 15 15:23:47 CST 2013: SCRUB started for /dev/cciss/c0d12 on P9B280GMQSJ57F
scrub: using DoD 5220.22-M patterns
scrub: please verify that device size below is correct!
scrub: scrubbing /dev/cciss/c0d12 500074307584 bytes (~465GB)
scrub: 0x00     |............................................|
scrub: 0xff     |............................................|
scrub: random   |............................................|
scrub: 0x00     |............................................|
scrub: verify   |............................................|
Sun Feb 17 22:59:18 CST 2013: SCRUB complete

*Fig. 2.*

**\* Failed Log:**

Fri Feb 8 15:10:30 CST 2013 - Log file created
Drive Serial Number: 5QM1AJ52
Device Name: /dev/cciss/c0d14
Physical Drive: 1:2
Drive located on Controller PAAAC0NMQT910J Disk /dev/cciss/c0d14: 500.0 GB, 500074307584 bytes
255 heads, 32 sectors/track, 119694 cylinders
Units = cylinders of 8160 * 512 = 4177920 bytes

===========================================

Fri Feb 8 15:12:02 CST 2013: SCRUB started for /dev/cciss/c0d14 on PAAAC0NMQT910J
scrub: using DoD 5220.22-M patterns
scrub: please verify that device size below is correct!
scrub: scrubbing /dev/cciss/c0d14 500074307584 bytes (~465GB)
scrub: 0x00     |............................................|
scrub: 0xff     |............................................|
scrub: random   |............................................|
scrub: 0x00     |.....................

System reports media as "failed" and moves log to register failure when progress halts or errors occur.

*Fig. 3.*

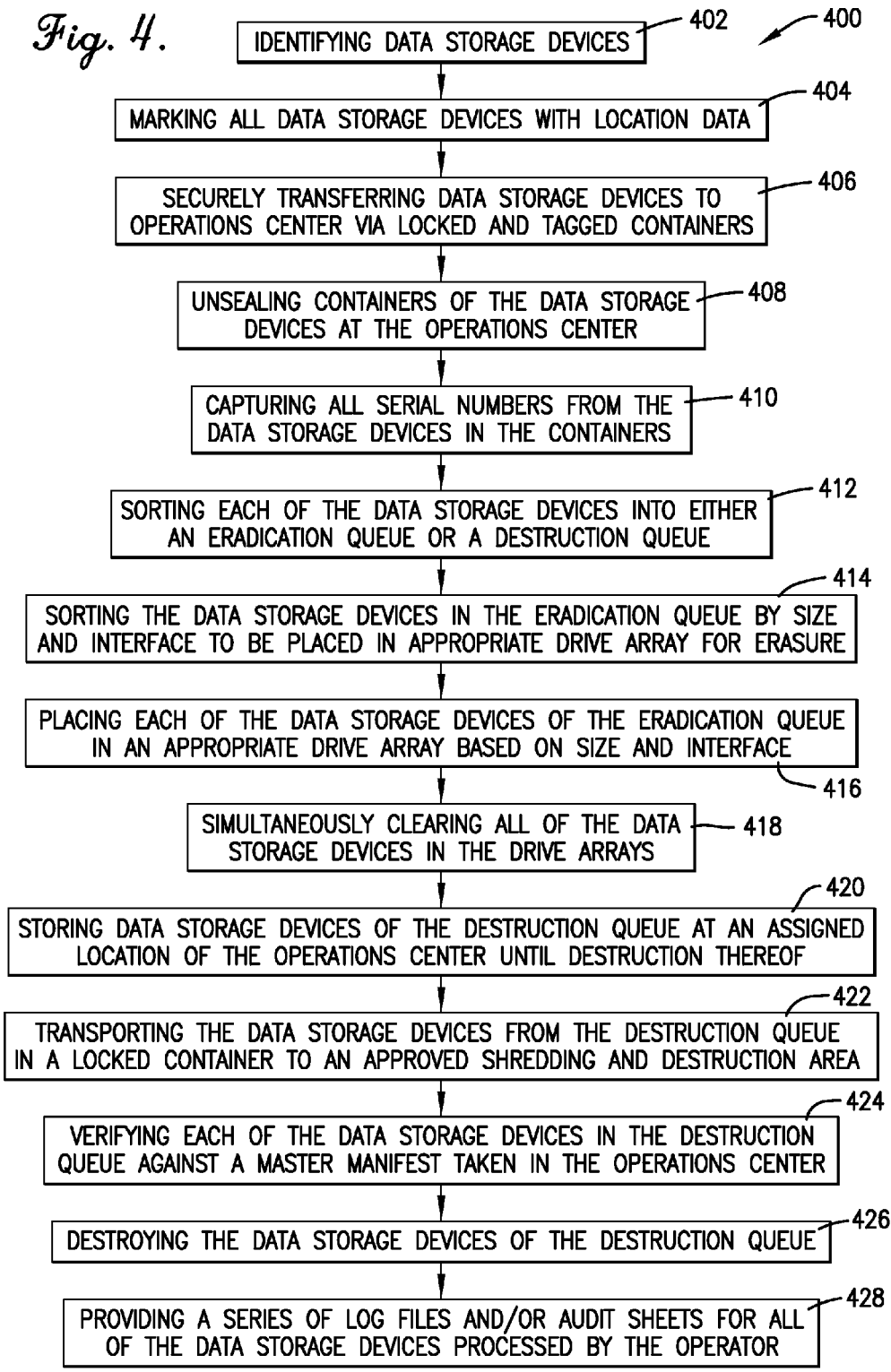

SECURE DATA ERASURE SYSTEM FOR ERASING A PLURALITY OF DATA STORAGE DEVICES

BACKGROUND

Computers, printers, scanners, servers, phone systems, smart phones, navigation devices, and handheld gaming devices may store a variety of information on various types of data storage devices. When these electronics are decommissioned, it is often desirable to erase all data from and/or physically destroy their associated data storage devices for privacy, security, or other purposes.

Data storage devices may be erased with hardware and software to overwrite all memory storage locations on the data storage devices. Some erasure methods are purely software-based solutions and may only "wipe" one hard drive at a time. Furthermore, some erasure software requires licenses on a per-disk basis. This can be cost-prohibitive for a company with a large quantity of electronics and data storage devices to erase.

Some hardware-based erasure systems can erase twenty-four hard disk drives at one time, but require expensive custom hardware specifically made for erasure only. For example, some such systems are designed to erase only IDE and SATA hard drives. Other hardware-based erasure systems can accept all major magnetic disk connection types, including IDE, SATA, Fibre Channel, SCSI, and SAS, for erasure, but can only erase up to eight hard disk drives at one time and also require expensive custom hardware specifically made for erasure only.

SUMMARY

Embodiments of the present invention solve the above described problems by providing an erasure system and method for simultaneous data erasure of a large quantity of data storage devices. The erasure system may generally comprise enterprise storage hardware and software used for data erasure instead of data storage. In accordance with various embodiments of the invention, the erasure system may include a server, drive arrays having receptacles for communicably coupling with the data storage devices, and a drive array controller configured for communicably coupling the server with the drive arrays. The server may be configured to receive specification information regarding each of the drive arrays and each of the data storage devices in the receptacles of the drive arrays for erasure and logging purposes. The server may then be configured to overwrite each of the data storage devices according to the DoD 5220.22-M standard, thereby erasing the data storage devices. The server may also be configured to create log files corresponding to each of the data storage devices, including information like time, date, and if the erasure of the data storage device is complete or has failed.

In another embodiment of the invention, a method for processing decommissioned data storage devices may include the steps of sorting data storage devices into an eradication queue and a destruction queue and physically destroying the data storage devices of the destruction queue. Next, the method may include sorting the data storage devices of the eradication queue by size and interface and placing each of the data storage devices of the eradication queue into drive arrays based on the size and interface of each of the data storage devices. Then the method may include the steps of clearing data on the data storage devices in the eradication queue according to DoD 5220.22-M standards using a server communicably coupled with the drive arrays and creating log files including information about the eradication of each of the data storage devices cleared.

In yet another embodiment of the invention, a physical computer-readable medium having a computer program stored thereon may be configured for operating an erasure system to simultaneously erase one or more types of data storage devices. The data storage devices may be communicably coupled to one or more drive arrays and the drive arrays may be communicably coupled with a server via a drive array controller. The computer program may include code segments for retrieving specification information regarding each of the drive arrays and for retrieving specification information regarding each of the data storage devices in the drive arrays. The specification information for the drive arrays may include a model and a serial number of each of the drive arrays connected to the drive array controller. The specification information for the data storage devices may include physical location within the drive arrays, serial number, and size. The computer program may also include code segments for overwriting each of the data storage devices with zeros, ones, and random characters according to the DoD 5220.22-M standard and for creating log files corresponding to each of the data storage devices. The log files may each contain information corresponding to one of the data storage devices and may each indicate if the erasure of the data storage device is complete or has failed. Finally, the computer program may include code segments for archiving or storing the log files in pass/fail subdirectories within directories corresponding to each of the drive arrays.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein:

FIG. 2 is an example log that is output and stored by the erasure system of FIG. 1 for a data storage device on which erasure thereof was successful;

FIG. 3 is an example log that is output and stored by the erasure system of FIG. 1 for a data storage device on which erasure thereof was not successful;

FIG. 4 is a flow chart of a method of sorting, eradication, and/or destruction of a plurality of data storage devices in accordance with an embodiment of the invention.

Figure 1:
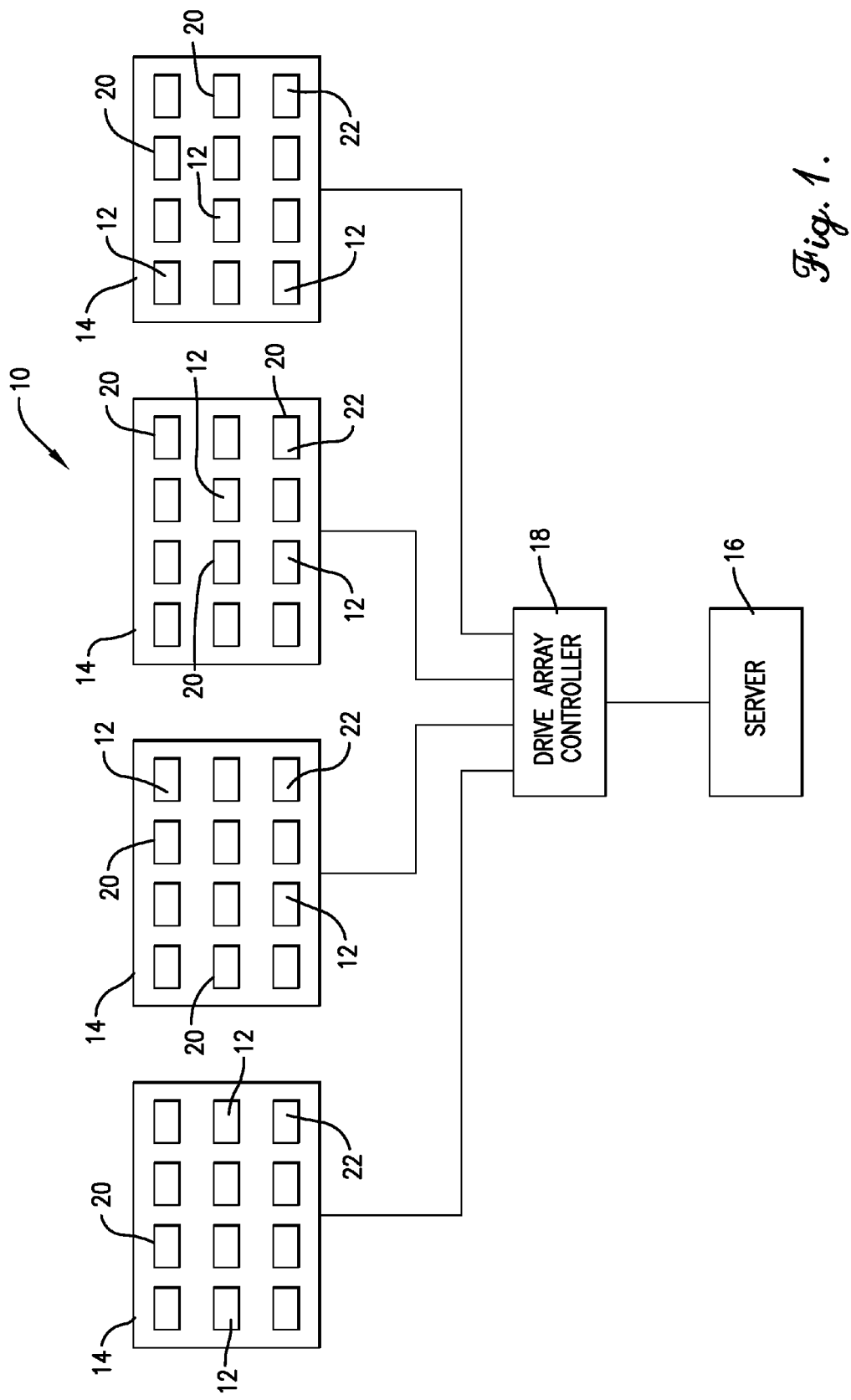
FIG. 1 is a schematic diagram of an erasure system constructed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

The present invention discloses an erasure system 10 and a method for data erasure and/or physical destruction of a plurality of data storage devices 12. The erasure system 10 may generally comprise enterprise storage hardware and software for facilitating the erasure of the data storage devices 12.

The data storage devices 12 may include any magnetic computer disk media, such as computer hard drives, floppy disks, compact flash, SD, all types of hard disk, tape, and paper/asset tags. For example, the data storage devices 12 may include hard disk drives or solid-state drives. Hard disk drives may generally be defined as storages devices containing rigid rotating platters, while solid-state drives may be defined as storage devices that have no moving parts. The data storage devices 12 may include a mix of hard drives of different types and sizes.

Data erasure is broadly defined herein as a software-based method using executable code segments and algorithms to overwrite data on the data storage devices 12 in a manner that completely destroys all electronic data residing on the data storage devices 12 (e.g., hard disk drives or other digital media). In some embodiments of the invention, this data erasure may be done by executing code segments of a software called "Scrub," written by Jim Garlick, as known in the art. Scrub overwrites data storage devices, hard disks, files, and other devices with repeating patterns intended to make recovering data from these devices more difficult. Scrub implements several different algorithms for this, including U.S. DoD 5220.22-M. Scrub compiles on most UNIX-like systems.

In general, erasure of the data storage devices 12 using the system and method described herein may be performed according to DoD 5220.22-M standards. DoD 5220.22-M is a United States Department of Defense standard for secure data erasure from magnetic media (e.g., computer hard disks or hard drives). Specifically, embodiments of the present invention include code segments and algorithms configured for clearing the data storage devices 12 according to national standards set forth in "Cleaning and Sanitization Matrix DoD 5220.22-M", Department of Defense, 1995. Additional details regarding clearing standards adhered to by the present invention may be found in "NIST Special Publication 800-88: Guidelines for Media Sanitation," by Richard Kissel et al., September 2006. This publication by Richard Kissel et al. defines standards for clearing or wiping different types of data storage devices.

The term "clearing" is generally defined herein as using software or hardware to overwrite storage space on the data storage device with non-sensitive data. A full definition of the term "clear," as defined herein, can be found in Table 5.1. Sanitation Methods, "NIST Special Publication 800-88: Guidelines for Media Sanitation," by Richard Kissel et al., 2012, which also defines the term "purge" and other suitable methods for data erasure. For example, code segments of the present invention may overwrite all addressable locations of the data storage devices 12 with a character, its complement, then a random character and verify.

Data erasure methods of the present invention may include an operator sorting, eradicating, and/or destroying the data storage devices 12. The operator may be any individual or group of individuals performing the method steps described herein, but is preferably one or more highly skilled, trained individuals with authority to perform the erasure steps described herein in a secure, monitored environment. Methods of eradicating the data storage devices 12 may be performed by the erasure system 10 via software, computer programs, code segments, and/or algorithms as described herein for locating, logging, and clearing each of the data storage devices 12.

As illustrated in FIG. 1, the erasure system 10 may comprise one or more drive arrays 14 configured to receive multiple ones of the data storage devices 12, a server 16, and a drive array controller 18 (such as a communication bus or expansion card) connecting one or more of the drive arrays 14 with the server 16. In some embodiments of the invention, the erasure system 10 may be configured to clear data storage devices 12 of differing sizes and types. In other embodiments of the invention, the erasure system 10 may comprise a plurality of erasure systems 10, each configured to clear data storage devices of a particular type or data storage devices having particular interface technologies, as outlined below.

Drive Arrays may be any type of disk enclosure configured to store and power a plurality of data storage devices, such as hard drives, and to communicably couple all of the data storage devices 12 therein to another computer or server, such as the server 16 described herein. Some drive arrays may comprise drive array controllers, cache in the form of volatile random-access memory (RAM) and non-volatile flash memory, disk enclosures for both magnetic rotational hard disk drives and electronic solid-state drives, and/or one or more power supplies. Some drive arrays may include advanced functionality, such as RAID and virtualization. RAID stands for "redundant array of independent disks" and is a storage technology that combines multiple disk drive components into a logical unit.

Examples of drive arrays may include the HP Modular Storage Array 20 (MSA20) and the HP ProLiant DL320 storage server, each developed and/or manufactured by Hewlett-Packard Company of Palo Alto, Calif. Other types of drive arrays include SCSI disk enclosures and Fibre Channel disk enclosures. However, any known drive arrays or disk enclosures may be used without departing from the scope of the invention.

The drive arrays 14 may be designed for compatibility with one or more types of interface technologies, thereby dictating which types of data storage devices these drive arrays may accept. These interface technologies may include Serial Advanced Technology Attachment (SATA), Small Computer Systems Interface (SCSI), Serial Attached SCSI (SAS), and Fibre Channel. SATA and SCSI are both common interfaces for computer disk systems. SAS is an enterprise-grade, high-performance disk interface. Fibre Channel is a storage area network (SAN) disk standard interface. Specifically, the MSA20 is a SATA disk enclosure or SATA drive array with a capacity of 12 SATA hard disks. The ProLiant DL320 storage server is a SAS enclosure or SAS drive array also configured to hold up to 12 hard disks. However, unlike the MSA20, the DL320 has server hardware integrated into it. The SAS system is generally faster and more accurate than the SATA system and is backwards-compatible with certain SATA hard disks.

In order to "hold" the data storage devices 12 described herein, the drive arrays 14 may comprise receptacles 20, such as disk drive bays, special metal rails, or "sleds" configured to attach to the data storage devices 12. The sleds may be metal rails that allow an operator to pull and push hard disks into the drive array or enclosure, providing a protective surface for the hard disk's electronics. So, for example, if one of the drive arrays 14 has a capacity for 12 hard disks, it may comprise 12 sleds or receptacles 20 for holding these hard disks.

In some embodiments of the invention, the drive arrays 14 may comprise or be coupled with a placeholder disk 22 configured to be inserted into one of the drive array receptacles 20 in place of one of the data storage devices 12. In embodiments of the invention utilizing the SATA interface technology for erasing data storage devices, the placeholder disk 22 must be created in each drive array. The placeholder disk 22 operates as a medium for storage of virtual disk information regarding each drive array 14. Specifically, the placeholder disk 22 of each drive array serves as a logical volume for building logical disks or links to the other physical data storage devices or hard drives loaded into the drive array. In some embodiments of the invention, the placeholder disk 22 may be located in the twelfth disk drive bay. Thus, in some embodiments of the invention, each of the drive arrays 14 may have a capacity of 11 data storage devices and one placeholder disk 22.

The drive arrays 14 may also comprise fault indicators configured to notify a user when one of the data storage devices 12 fails. For example, an orange "fail" light may illuminate if the MSA 20 detects that a magnetic disk has failed or is predicted to fail. For example, some of the drive arrays 14, such as the MSA 20 may be designed to read Self-Monitoring, Analysis, and Reporting Technology (SMART) data from the data storage devices 12 inserted therein. This information may indicate possible failure, imminent failure, and total failure of each of the data storage devices 12, thus triggering one of the fault indicators, such as turning on a light or sounding an alarm.

The server 16 may include any number of computer processors, servers, controllers, integrated circuits, programmable logic devices, or other computing devices and resident or external memory for storing data, executable code segments, images, and other information accessed and/or generated by the server 16. In some embodiments of the invention, the server 16 may be a computer server, such as an HP computer server developed and/or manufactured by Hewlett-Packard Company of Palo Alto, Calif. A server may be defined herein as a hardware computing platform designed for higher workloads, such as constant disk activity, or providing necessary services to clients in a computer network.

As illustrated in FIG. 1, the server 16 is preferably coupled with the drive arrays 14 through wired or wireless connections, such as the drive array controller 18, to enable information to be exchanged between the server 16 and the drive arrays 14 or the data storage devices 12 connected to the drive arrays 14. The server 16 may also include and/or be coupled with a user interface, a display, a power source, I/O ports, and other standard computer processor or server components known in the art.

The server 16 may utilize any operating system known in the art for receiving and executing commands from a user and/or various software programs, code segments, algorithms, and the like. For example, the server 16 may be configured for Linux, an operating system written by Linus Torvalds and currently licensed under the GNU GPL General Public License. In one example embodiment of the invention, the server 16 may run on the Community Enterprise Operating System (CentOS). Furthermore, in some embodiments of the invention, software, computer programs, algorithms, or code segments described herein may use HP Array Configuration Utility Command Line Interface (HP ACUCLI) developed by Hewlett-Packard Company of Palo Alto, Calif. The HP ACUCLI software may allow the Linux operating system to communicate with the HP hardware, such as the MSA 20 and the Smart Array 6400 RAID card described above, allowing the server 16 to read information such as serial numbers, sizes, and other details of the data storage devices 12 in each drive array.

The server 16 may have a computer program, algorithms, and/or code segments stored thereon or accessible thereby for performing the method steps described herein. The computer program preferably comprises an ordered listing of executable instructions for implementing logical functions in the server 16. The computer program can be embodied in any computer-readable medium for use by or in connection with an instruction execution system, apparatus, or device, and execute the instructions. In the context of this application, a "computer-readable medium" can be any system and/or device that can contain, store, communicate, propagate, or transport the program for use by or in connection with an instruction execution system, apparatus, or device. The computer-readable medium can be, for example, but not limited to, an electronic, magnetic, optical, electromagnetic, infrared, or semi-conductor system, apparatus or device. More specific, although not inclusive, examples of the computer-readable medium would include the following: an electrical connection having one or more wires, data storage devices such as hard disk drives or solid-state drives, a portable computer diskette, a random access memory (RAM), a read-only memory (ROM), an erasable, programmable, read-only memory (EPROM or Flash memory), an optical fiber, and a portable compact disk read-only memory (CDROM).

The memory of the server 16 may include, for example, removable and non-removable memory elements such as RAM, ROM, flash, magnetic, optical, USB memory devices, and/or other conventional memory elements. The memory may store various data associated with the erasure system 10, such as the computer program and code segments mentioned above, or other data for instructing the server 16 and its associated drive arrays to perform the steps described herein. Further, the memory may store data retrieved from any of the drive arrays 14 or the data storage devices 12 communicably coupled to the server 16. The various data stored within the memory may also be associated within one or more databases to facilitate retrieval of the information. In some embodiments of the invention, executable code segments of the software Scrub, described above, may be stored by or accessed by the server 16.

The user interface of the server 16 may permit a user to operate the erasure system 10 and enables users, third parties, or other devices to share information with the erasure system 10. The user interface may comprise one or more functionable inputs such as buttons, switches, scroll wheels, a touch screen associated with the display, voice recognition elements such as a microphone, pointing devices such as mice, touchpads, tracking balls, styluses, a camera such as a digital or film still or video camera, combinations thereof, etc. Further, the user interface may comprise wired or wireless data transfer elements such as removable memory, data transceivers, etc., to enable the user and other devices or parties to remotely interface with the erasure system 10. The user interface may also include a speaker for providing audible instructions and feedback.

The display may comprise a graphical interface operable to display visual graphics, images, text, etc. in response to external or internal processes and commands. For example, the display may comprise conventional black and white, monochrome, or color display elements including CRT, TFT, LCD, and/or LED display devices. The display may be integrated with the user interface, such as in embodiments where the display is a touch screen display to enable the user to interact with it by touching or pointing at display areas to provide information or selections to the server 16. The display may be coupled with or integral with the server 16 and may be operable to display various information corresponding to the quantity of drive arrays, the quantity of the data storage devices 12, the location of each of the data storage devices 12, serial numbers and sizes of the data storage devices 12, types of the data storage devices 12, types of the drive arrays 14, times and dates of erasure, success or failure of erasure of one or more of the data storage devices 12, etc.

The power source of the server 16 provides electrical power to various erasure system 10 elements. For example, the power source may be directly or indirectly coupled with the server 16, the drive arrays 14, the data storage devices 12, and/or the drive array controller 18. The power source may comprise conventional power supply elements such as batteries, battery packs, etc. The power source may also comprise power conduits, connectors, and receptacles operable to receive batteries, battery connectors, or power cables.

The I/O ports of the server 16 permit data and other information to be transferred to and from the server 16, the drive array controller 18, the drive arrays 14, and/or the data storage devices 12. The I/O ports may include a TransFlash card slot for receiving removable TransFlash cards, a USB port for coupling with a USB cable connected to another component of the erasure system 10, a SCSI port for coupling with one or more SCSI cables connected to another component of the erasure system 10, and/or a fiber optic port coupling with one or more fiber optic cables connected to another component of the erasure system 10.

The drive array controller 18 may be any communication bus, controller card, SCSI interface or expansion card known in the art and capable of connecting to and communicating with the server 16 and the drive arrays 14. Two examples of drive array controllers include the HP Smart Array 6400 RAID controller card and the HP Smart Array P400i RAID controller card, each developed and/or manufactured by Hewlett-Packard Company of Palo Alto, Calif. Specifically, the Smart Array 6400 may be capable of connecting to and communicating with the MSA 20 enclosure, while the Smart Array P400i is a more advanced SAS-capable controller founding many newer HP server systems and may be used to connect the ProLiant DL320 with the server 16. For the destruction of SCSI disks, SCSI interface cards or host bus adapters (HBAs) may be used, along with SCSI cables for connecting the SCSI interface cards with SCSI disk enclosures. For Fibre Channel disks, a compatible Qlogic fiber optic HBA may be used along with fiber optic cables, as necessary.

The drive array controller 18 may be used to increase the number of drive arrays that can be connected to the server 16 and therefore increase the total number of data storage devices that can be erased simultaneously. For example, in some embodiments of the invention, four MSA20 disk enclosures (i.e., drive arrays) may be connected to the server 16 via the Smart Array 6400 RAID controller card.

In various embodiments of the present invention, the operator may perform a method of manual sorting, documenting, and loading of the data storage devices 12 into the erasure system 10 and may then command the erasure system 10 to clear the data storage devices 12 therein and log the results, as described in detail below.

The flow chart of FIG. 4 depicts the steps of an exemplary method 400 of sorting, eradicating, and/or destroying a plurality of data storage devices in more detail. In some alternative implementations, the functions noted in the various blocks may occur out of the order depicted in FIG. 4. For example, two blocks shown in succession in FIG. 4 may in fact be executed substantially concurrently, or the blocks may sometimes be executed in the reverse order depending upon the functionality involved.

Specifically, the method 400 may include a step of identifying data, as depicted in block 402, including all data storage devices and media types, such as floppy disks, compact flash, SD, all types of hard disk, tape, and paper/asset tags. Next, the method 400 may include a step of marking all data storage devices with location data, as depicted in block 404, and transferring the data storage devices 12 to an operations center via locked and tagged containers, as depicted in block 406. The operations center may be a secure, locked, and video-monitored room. Next, the method 400 may include the steps of the operator unsealing the containers at the operations center, as depicted in block 408, and capturing all serial numbers from the data storage devices 12 contained therein, as depicted in block 410. If no serial numbers are present, physical counts may be taken, logged, and recorded via 24-hour surveillance, such as via surveillance video and/or photography equipment.

The method may also include a step of sorting the data storage devices 12 by value of reuse or resale into an eradication queue or a destruction queue, as depicted in block 412. Specifically, the data storage devices 12 in high demand may be moved to an eradication queue for erasure by the erasure system 10. The "legacy" or otherwise non-usable data storage devices or data storage devices containing sensitive data may be moved to a destruction queue to be physically destroyed by the operator or by other trained and authorized individuals. Step 412 may additionally include creating a master manifest of the data storage devices placed into the eradication queue and into the destruction queue, for later use.

After the data storage devices 12 have been sorted as described above, the method 400 may include additional sorting of the data storage devices 12 in the eradication queue. Specifically, the data storage devices 12 in the eradication queue may be sorted by size and interface, as depicted in block 414, and then may be distributed by the operator to the appropriate drive array for erasure, as depicted in block 416. For example, a SCSI drive may be placed into and communicably coupled with a SCSI enclosure that is communicably coupled to the server 16. Likewise, a SATA hard drive may be placed into and communicably coupled with a SATA drive array, such as the MSA20, that is communicably coupled to the server 16 via the drive array controller 18, such as the Smart Array 6400 described above. For a correct fit, special metal rails or sleds may need to be attached to the data storage devices 12. These metal rails may allow the operator to pull and push the data storage devices 12 into the drive array and provide a protective surface for the data storage device's electronics.

Once the data storage devices 12 in the eradication queue are each communicably coupled with a corresponding one of the drive arrays 14, the method 400 may comprise simultaneously clearing all of the data storage devices 12 in the drive arrays 14, as depicted in block 418. This may be done by following a step-by-step operations guide for accurate eradication of data on the data storage devices 12. The step-by-step operations guide may be presented by the server 16 to the operator in a variety of ways via the display. Alternatively, the operations guide may be provided as a printed manual or any other type of publication for viewing by the operator. The operations guide may provide a menu of operator-selectable options or may indicate command lines which the operator may input via the user interface to properly eradicate data from the data storage devices 12 using the server 16. Details of computer programs, executable code, and algorithms used by the server 16 to eradicate data from the data storage devices 12 is described in further detail below.

The method 400 may also include storing data storage devices 12 of the destruction queue at an assigned location of the operations center until the operator is prepared to destroy the data storage devices 12 in the destruction queue, as depicted in block 420. Then the method 400 may comprise transporting the data storage devices 12 from the destruction queue in a locked container to an approved shredding and destruction area, as depicted in block 422. Next, the method 400 may comprise verifying each of the data storage devices 12 in the locked container against a master manifest taken at the time of retrieval in the operations center, as depicted in block 424. Once verified, the method 400 may include destroying the data storage devices 12 of the destruction queue, as depicted in block 426. Specifically, the operator, while under constant video surveillance, may insert the data storage devices 12 of the destruction queue into one of a variety of appropriate destruction devices. The destruction devices may include a shredder, a punch, or any device known in the art for physically destroying data storage devices.

Finally, the method 400 may comprise providing a series of log files and/or audit sheets for all of the data storage devices 12 processed by the operator, as depicted in block 428. This information may be archived or sent to any governing body for review. The log files may comprise serial numbers, sizes of data storage devices, types of data storage devices, physical locations of the data storage devices 12 within the drive arrays 14, dates and times of starting and/or finishing erasure or physical destruction of the data storage devices 12, output from the server 16 during and/or following erasure procedures described herein, pass or fail status of erasure of the data storage devices 12 in the eradication queue, the type of erasure standard or erasure algorithms used to clear the data storage devices 12 in the eradication queue (e.g., DoD 5220.22-M), and/or any other information regarding the data storage devices 12 and/or the erasure system 10 used to clear any of the data storage devices 12. FIG. 2 illustrates an example of a log file for one of the data storage devices 12 that was successfully erased and FIG. 3 illustrates an example of a log file for one of the data storage devices 12 that failed to properly erase.

Figure 5:
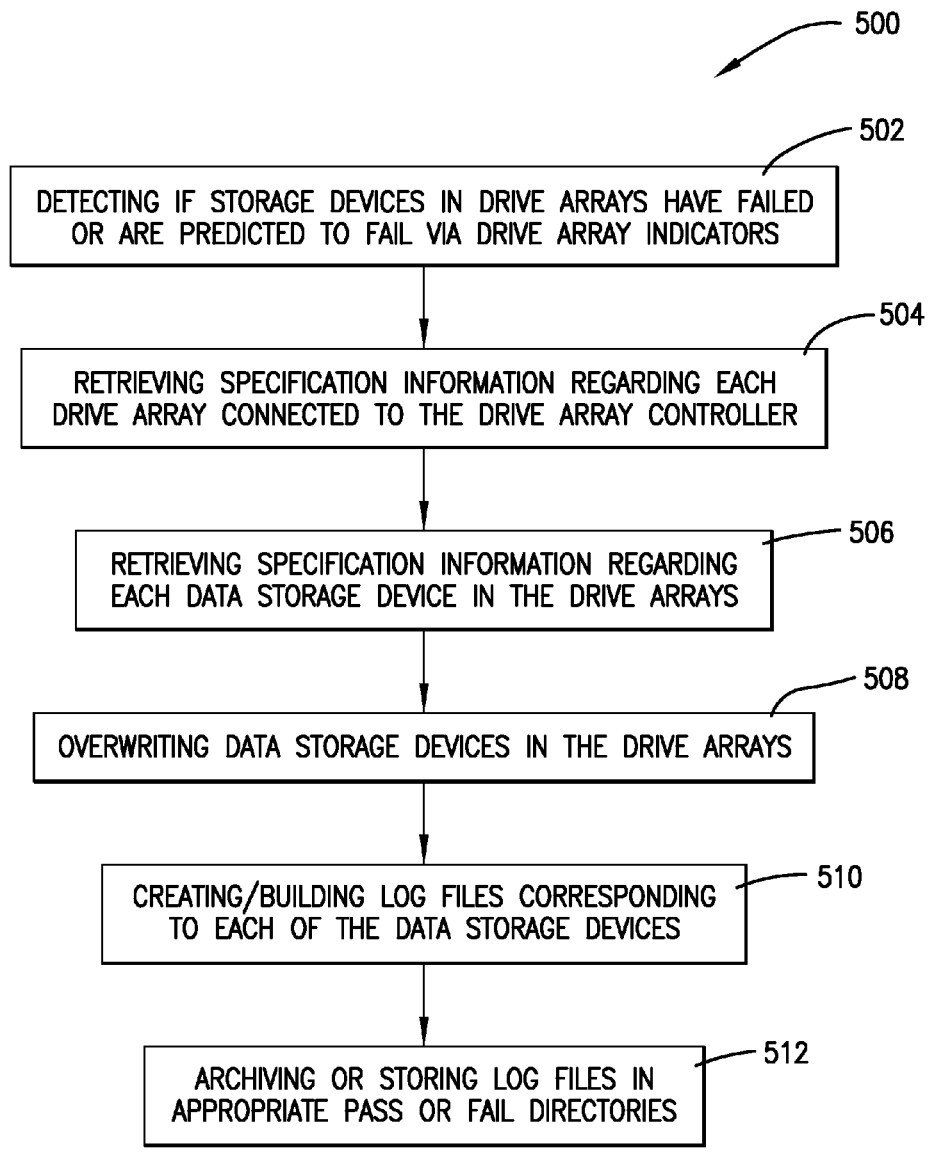
FIG. 5 is a flow chart of a method of erasure of a plurality of data storage devices in accordance with an embodiment of the invention.

Details of step 418 of the method 400, as depicted in FIG. 4, may now be described in greater detail. Specifically, the flow chart of FIG. 5 depicts the steps of an exemplary method 500 of performing simultaneous clearing or erasure of a plurality of data storage devices in more detail. In some alternative implementations, the functions noted in the various blocks may occur out of the order depicted in FIG. 5. For example, two blocks shown in succession in FIG. 5 may in fact be executed substantially concurrently, or the blocks may sometimes be executed in the reverse order depending upon the functionality involved.

The method 500, as illustrated in FIG. 5, may comprise a step of detecting if any of the data storage devices 12 in the drive arrays 14 have failed or are predicted to fail, as depicted in block 502, by way of indicators provided on the drive arrays 14 and described above. If the drive arrays 14 indicate that any of the data storage devices have failed or are predicted to fail, the operator may remove these devices for placement in the destruction queue. Next, the method may comprise the step of retrieving specification information regarding each of the drive arrays 14 connected to the drive array controller 18, as depicted in block 504. This specification information may include a model and a serial number of each of the drive arrays. Then, the method 500 may include the step of retrieving specification information regarding each of the data storage devices 12 in the drive arrays 14, as depicted in block 506. This specification information may include physical location within the drive arrays, serial number, and size.

Furthermore, the method 500 may include the step of overwriting all memory locations on each of the data storage devices 12 in the drive arrays 14, as depicted in block 508. For example, the memory locations of the data storage devices 12 may be overwritten with zeros, ones, and random characters according to the DoD 5220.22-M standard by executing code segments of erasure software, such as Scrub. The method 500 may also comprise the step of creating log files corresponding to each of the data storage devices, as depicted in block 510. Specifically, during the clearing or overwriting step 508, progress of the erasure of each of the data storage devices 12 is output to each corresponding individual log file, as described below. Each of the log files may contain information corresponding to at least one of the data storage devices 12 and each may indicate if the erasure of the data storage device is complete or has failed. For example, the log files may include time, date, serial number, size, sector information, type of erasure standard used, and whether the erasure or clearing was successful or not (e.g., pass or fail).

In some embodiments of the invention, the method 500 may also include the step of archiving or storing the log files in appropriate directories, as illustrated in block 512. For example, the log files may be stored in directories labeled according to their corresponding drive arrays 14 and in subdirectories thereof corresponding to whether erasure of the data storage device is complete or has failed.

Details of how the server 16 clears the data storage devices 12 loaded into and communicably coupled with the drive arrays 14 may vary depending on the type of drive interface technology utilized. Specifically, the drive arrays 14 may be designed for compatibility with one or more types of interface technologies, thereby dictating which types of data storage devices these drive arrays may accept and what additionally steps may be needed. For example, in embodiments of the invention using SATA interfaces, special logical unit numbers (LUNs) or "logical volumes" may be created for each of the data storage devices 12 in each of the drive arrays 14, in order for the server 16 to properly communicate with the drive arrays 14 via the drive array controller. Therefore, example methods for clearing multiple data storage devices loaded into and communicably coupled with one or more drive arrays are provided for each of these interface technologies below.

Note that although different drive arrays 14 and/or drive array controllers 18 may be utilized in each of the example methods below, the hardware and software of the server 16 may be configured to perform any of these example methods, regardless of the interface technologies, drive arrays, and drive array controllers used. For example, computer programs stored in or accessed by the server 16 may include code segments configured for SATA drive arrays, code segments configured for SAS drive arrays, code segments configured for SCSI drive arrays, and/or code segments configured for Fibre Channel drive arrays without departing from the scope of the invention. In some embodiments of the invention, the server 16 may be communicably coupled with multiple types of drive array controllers simultaneously, such that multiple types of drive arrays and multiple types of data storage devices can be cleared using a single server configured to perform any or all of the method steps described below. Alternatively, the erasure system 10 may include a plurality of servers each connected to different drive arrays and drive array controllers without departing from the scope of the invention.

Erasure of data storage devices loaded into and communicably coupled with SATA drive arrays may use HP Array Configuration Utility Command Line Interface (HP ACU-CLI), a third-party proprietary software component developed by Hewlett-Packard Company of Palo Alto, Calif. The HP ACUCLI allows the Linux operating system to communicate with the HP hardware, such as MSA20 and Smart Array 6400 RAID card described above. Specifically, this allows the operating system of the server 16 to access information such as serial numbers, sizes, and other details of the data storage devices 12.

The SATA drive arrays may each be provided with the placeholder disk 22 described above for acting as a medium for the storage of virtual disk information on each of the data storage devices 12. For example, the placeholder disk 22 may be located in the twelfth disk drive bay or receptacle 22 of the MSA20 SATA drive array and each of the SATA drive arrays may therefore have a capacity of 11 data storage devices and one placeholder disk 22.

Once each of the data storage devices 12 are inserted into the drive arrays 14, the drive arrays 14 may read low level information from each of the data storage devices' electronics and firmware. This information may indicate possible failure, imminent failure, and/or total failure of each of the data storage devices 12 (e.g., magnetic disks). This information is known as "Self-Monitoring, Analysis, and Reporting Technology" (SMART) data. If the drive array detects that one of the data storage devices 12 has failed or is predicted to fail, an orange "fail" light may illuminate (or other indicators may be actuated), indicating that that one of the data storage devices 12 will not be used. This allows the operator to pull and mark "bad" or failing data storage devices for physical destruction. The use of SMART data analysis can save the operator time and troubleshooting efforts, as well as guarantees tested, refurbished products per the R2 and RIOS standards, as known in the art.

Next, the operator may execute a code segments for using the HP ACUCLI to read details of all data storage devices 12, the drive array controller 18, and the drive arrays 14 connected to the server 16. The method may then include inserting these details into a first configuration file. The first configuration file may be overwritten each time this step is performed. The first configuration file may contain two lines of information for each drive array found by the server 16 or drive array controller 18, namely the model of the drive array and the serial number of the drive array. The first configuration file may be used in later steps of the method to allow the executable code segments to reference serial numbers pertaining to each drive array, allowing the server 16 to make pointed commands to each of the drive arrays 14.

Next, a command (using HP ACUCLI) may be executed on each drive array, using each serial number out of the first configuration file from the previous step, to list details of the physical data storage devices inserted into each drive array. This step may be performed when commanded by the operator via the user interface or may be automated to occur after the previous method step is complete. The details of the data storage devices 12 listed may include physical location (array position within the drive array), serial number, size, and other miscellaneous information. Then these details of the drive arrays 14 may be inserted into a series of second configuration files labeled as the individual serial numbers of each of the drive arrays 14.

Once the configuration files are created, logical unit numbers (LUNs) or "logical volumes" may be created for each of the data storage devices 12 in each of the drive arrays 14, so that the drive array controller 18 can present the LUNs to an operating system on the server 16. Specifically, the logical volumes or LUNs are created on the placeholder disks 22 of each of the SATA drive arrays. The LUNs may be described as a shortcut to the physical data storage device or a reference to the data storage device that the drive array controller 18 or RAID controller presents to the operating system on the server 16. The logical volume or LUN allows the operating system to see and write to the data storage devices 12. LUNs may be created for each of the data storage devices 12 in each of the drive arrays 14 individual using the HP ACUCLI and separate executable code segments or scripts for each of the drive arrays 14. For example, if four drive arrays are detected by the server 16, four separate scripts or code segments will be used to create the logical volumes or LUNs for the data storage devices 12 in each of the four separate drive arrays. The operator may input command lines or otherwise initiate the running of each of the code segments for creating the LUNs via the user interface. In response, the server 16 may then reference the second configuration files containing details for each of the data storage devices 12 and execute a pointed command using the HP ACUCLI to create a LUN for each of the data storage devices 12 listed in the second configuration files. After the LUNs are created, each of the data storage devices 12 in the drive arrays 14 are fully presented to the operating system and the operating system of the server 16 can now read and write to these data storage devices.

Next, the log files may be created for each of the data storage devices 12 in each of the drive arrays 14. This may be performed by the operator via the user interface or by automated execution of code segments accessible by the server 16. Specifically, the server 16 may document a size and serial number of each of the data storage devices 12 and details of erasure thereof. The log files accept output from software or code segments executed to clear each of the data storage devices 12, such as the Scrub software described above. As with the creation of the LUNs, the log creation may use separate executable code segments or scripts for each of the drive arrays 14. These executable code segments or scripts may be configured to extract serial numbers from the second configuration files of the data storage devices 12 to use as file names for each log file. Each log file may be placed in an appropriate directory on the server 16 to be stored and written to during erasure of each of the data storage devices 12.

Clearing or erasure of the data storage devices 12 may include the operator (or the server 16, in an automated manner) executing code segments or scripts for each of the drive arrays 14 to start a scrub process (i.e., erasure of the data storage devices 12). This scrub process may include the server 16 reading the log files to find locations of each of the data storage devices 12 as the operating system sees it. The server 16 may then pass this information to a scrub computer program or code segments configured for performing a DoD 5220.22-M standard erase on each of the data storage devices 12. The server 16 may also be configured to output progress of the scrub computer program or code segments to each individual log file until the scrub process is complete.

As any of the data storage devices 12 fail through the scrub process, by mechanical or magnetic failure, or if the scrub computer program or code segments just cannot finish the eradication on the data storage device, the corresponding log file is moved by the server 16 to a special "failed" folder or directory for storage therein. After completion of the scrub process, the operator can see all of the serial numbers (i.e., log files named as serial numbers) in the failed folder and physically mark them for destruction.

Once the scrub process is complete, then all LUN information on all drive arrays may be purged, removed, or otherwise deleted. This will prepare the erasure system 10 for a next batch of data storage devices to be processed. Specifically, the operator may execute a code segment or script on each drive array, using the HP ACUCLI, to remove or erase LUN information from the drive array controller 18 or RAID controller configuration.

The log files created during the scrub process may then be archived. Specifically, one code segment or script may be executed by the server 16 for archiving completed logs (log files for data storage devices that were successfully erased), and another code segment or script may be executed by the server 16 for archiving the failed log files corresponding to the failed data storage devices, as defined above. The archival process may result in a dated and time-stamped Tape Archive or ".tar" file, which may be compressed and placed into a special archive folder or directory on the server 16 or external memory associated with and communicably coupled with the server 16.

When the operator commands the server 16 to archive the log files, the operator may be prompted by the server 16 to input a "client" identifier. This client identifier may be anything that a business would use to track a customer or client. After insertion of the client identifier, the operator may be prompted by the server 16 to provide a "work order" or "work order number." This work order number, if applicable, may be appended to the client identifier and may become a first portion of the name of the tape archive. Specifically, the server 16 may create a file name similar to the following example file name for the completed log files: CLIENTID_WORKORDER_COMPLETED_DATETIME.tar.gz and a file name similar to the following example file name for the failed log files: CLIENTID_WORKORDER_FAILED_DATETIME.tar.gz. The server 16 may be configured to determine if there is an existing client folder in an archive directory. If one does not exist, code segments may be executed by the server 16 to create a client folder in the archive directory, along with appropriate "complete" and "failed" subdirectories therein.

The methods for erasure of data storage devices loaded into and communicably coupled with SAS drive arrays is nearly identical to the example methods described above for SATA drive arrays, except that the computer program, code segments and scripts are altered for use with a different type of drive array controller or RAID controller. For example, the SAS drive arrays may be coupled to the server 16 via the HP Smart Array P400i RAID controller card described above. SAS drive arrays, such as the HP DL320 described above, resemble the SATA drive arrays such as the MSA20, except that the placeholder disk 22 is replaced with a disk that serves a dual purpose, holding a relevant operating system (e.g., Linux) and the LUNs or logical volumes. The steps that the operator follows physically and through software are otherwise identical to those performed in the SATA erasure system described above.

Some advantages of using the SAS drive arrays and SAS drive array controllers for erasure of data storage devices include increased speed and accuracy and backwards compatibility with certain SATA data storage devices. This may be helpful in situations where a certain SATA data storage device is not supported by the MSA20 drive array. The SAS drive arrays (e.g., Smart Array P400i) are capable of detecting pre-fail and total failure of magnetic disks using the SMART data analysis, as described above for the SATA drive arrays.

Erasure of SCSI data storage devices or SCSI disks, according to embodiments of the present invention, may be performed using SCSI interface cards or HBAs, SCSI drive arrays, and appropriate SCSI cables for connection between the SCSI drive arrays and SCSI drive array controllers, such as SCSI interface cards or HBAs. Unlike SATA drive arrays, SCSI HBAs allow the operating system of the server 16 to see the data storage devices 12 individually. This method of data storage device or disk presentation to the operating system is known as "just a bunch of disks" (JBOD). Thus, the method of erasure of SCSI data storage devices differs from the SATA and SAS methods described above in that there is no need to create LUNs, since the operating system already has access to the data storage devices 12 physically (non-RAID).

Unlike most SATA and SAS drive arrays, the SCSI drive arrays do not necessarily have predictive SMART data analysis. Therefore, if a data storage device is failing, it is generally not known until the data storage device actually fails during its erasure process, at which point the server 16 will place the log file for that data storage device into the "failed" director, as described in the method steps used for the SATA erasure system described above.

Following insertion of the data storage devices 12 into the SCSI drive arrays, there server 16 may be booted or turned on. If there are any problems with the data storage devices 12, SCSI drive arrays, or HBAs, the server's BIOS (Basic Input/Output System) or the BIOS of the HBA will notify the operator on the display. If the server 16 is turned on or booted before inserting the data storage devices 12 into the SCSI drive arrays, the SCSI HBA may not recognize and export the data storage devices 12 to the operating system of the server 16.

After the operating system has fully completed its boot process, all SCSI type data storage devices and their details as seen by the operating system may be listed. This listing may be performed by the server 16 using various code segments or scripts, including, for example, basic Linux and UNIX commands, such as the command "lsscsi," which will list all SCSI type data storage devices and their details. The resulting list and the corresponding details may be displayed on the display of the server 16, allowing the operator to ensure that the data storage devices 12 that are intended to be wiped are able to be processed by the computer program and relevant code segments for SCSI erasure.

Next, a temporary "Scrub list" may be created by an operator executing an appropriate command or script using Linux and/or UNIX commands, such as fdisk, lsscsi, grep, and awk, as known in the art. These commands may be used to perform an audit of all data storage devices recognized by the operating system and to place device location shortcuts for the data storage devices 12 into a flat text file. The device location shortcuts may be Linux and UNIX standard for device hard links in a special directory within the operating system of the server 16. For example, if a data storage device is connected to the SCSI drive array, and the Linux operating system recognizes the data storage device, the data storage device may be placed into the "dev" directory and labeled in systematic order. So one of the data storage devices 12 may be recognized and listed as "/dev/sdb" (i.e., SCSI disk B) by the operating system, and the next ones of the data storage devices 12 may be listed as "/dev/sdc", "/dev/sdd", and so on. Using these shortcuts, the computer programs and code segments of the present invention may write to and read the physical data storage devices.

The scrub list described above may be used in conjunction with the "smartctl" program, known in the art, to extract information about each of the data storage devices 12, such as size, serial number, and sector information. Using this information, the server 16 may create log files for each of the data storage devices 12, titled as the data storage devices' serial numbers, containing size and location information.

Information from the log files, such as data storage device location information, may be passed to a scrub computer program on the server 16 to be cleared using the DoD 5220.22-M secure erasure standard. Progress of erasure of each of the SCSI data storage devices may be logged into corresponding ones of the log files. This process only requires one script to be executed, instead of different code segments or scripts for each of the drive arrays 14 as in the SATA erasure method described above. This one script selects all of the SCSI data storage devices listed in the "Scrub list" to be cleared.

Finally, all log files may be archived as described above. Specifically, the log files may be placed into the appropriate client directory in either "failed" or "complete" subdirectories therein. The client directory and failed or complete subdirectories may be located on the server 16 or on one or more data storage devices communicably coupled with the server 16.

Erasure of Fibre Channel data storage devices may be substantially identical to the process for SCSI erasure described above. The only difference is the hardware used. The hardware may include compatible Qlogic fiber optic HBA, Fibre Channel disk enclosure or drive array, and fiber optic cables as necessary.

Because the erasure system 10 and the methods described herein are designed to work with enterprise hardware (e.g., large scale data storage hardware), a large quantity of data storage devices can be cleared simultaneously. For example, four SATA drive arrays holding 11 data storage devices (excluding the placeholder disk 22 in each) can be attached to one expansion card or drive array controller 18 connected to the server 16. Four servers may be stored in a cabinet, allowing for 176 data store devices per cabinet. SCSI and Fibre Channel can potentially handle 2304 data storage devices per server, but may experience hardware limitations necessitating that they be divided up between different servers. SAS drive arrays are capable of containing 11 data storage devices per server.

Because the erasure system 10 and the methods described herein use the Linux operating system, with very low overhead shell scripts, all system resources can be applied to data erasure operations. This provides an advantage of speed and accuracy. The simple design of the supporting software and computer programs used in the methods above (such as Scrub, Linux/UNIX, etc.) and the accuracy of the completed and failed logs ensures that no data storage device can "slip by" if it fails to wipe properly.

The logging capabilities of the present invention provide information about the data storage devices 12 including serial number, size, miscellaneous sector information, and detail of each erasure pass on the data storage device. This advantageously allows for later auditing of data storage devices that have been processed through each server.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes following:

1. An erasure system for erasing a plurality of data storage devices, the erasure system comprising:
   a server;
   a plurality of drive arrays each having a plurality of receptacles for receiving and communicably coupling to one of the data storage devices;
   a placeholder disk inserted into one of the receptacles of at least one of the drive arrays and communicably coupled with the drive arrays; and
   a drive array controller configured for communicably coupling the server with the plurality of drive arrays,
   wherein the server is configured for:
      receiving specification information regarding each of the drive arrays;
      receiving specification information regarding each of the data storage devices in the receptacles of the drive arrays;
      overwriting each of the data storage devices with zeros, ones, and random characters;
      creating log files corresponding to each of the data storage devices and storing the log files in directories corresponding to each of the drive arrays, wherein each of the log files contains information corresponding to at least one of the data storage devices and each indicates if the erasure of the data storage device is complete or has failed;
      creating a first configuration file for the drive array controller, the configuration file comprising a serial number and model of each of the drive arrays;
      creating a second configuration file using the serial numbers and model numbers of the first configuration file to access and store details of the data storage devices in each of the drive arrays;
      creating logical unit numbers (LUNs) or logical volumes on the placeholder disk in one of the receptacles of at least one of the drive arrays using information from at least one of the first and second configuration files, wherein the LUNs or logical volumes correspond with a physical location of the data storage devices within the drive arrays; and
      presenting the LUNs or logical volumes to the drive array controller for facilitating communication between the server and the data storage devices.

2. The erasure system of claim 1, wherein the specification information regarding each of the drive arrays includes the model and the serial number of each of the drive arrays connected to the drive array controller.

3. The erasure system of claim 1, wherein the specification information regarding each of the data storage devices includes at least one of physical location, serial number, and size.

4. The erasure system of claim 1, wherein the server is further configured to archive the log files in directories corresponding to whether the erasure of the data storage device is complete or has failed.

5. The erasure system of claim 1, wherein each of the drive arrays and each of the drive array controllers are configured for SATA, SAS, SCSI, or Fibre Channel interfaces.

6. The erasure system of claim 1, wherein the server is also configured for deleting the logical unit numbers (LUNs) or logical volumes from the placeholder disk after overwriting the data storage devices.

7. The erasure system of claim 1, wherein the drive array controller is at least one of an expansion card, an interface card, a RAID controller card, and a host bus adapter (HBA).

8. A method for processing decommissioned data storage devices, the method comprising:
- sorting data storage devices into an eradication queue and a destruction queue;
- physically destroying the data storage devices of the destruction queue;
- sorting the data storage devices of the eradication queue by size and interface;
- placing each of the data storage devices of the eradication queue into one of a plurality of receptacles of at least one of a plurality of drive arrays based on the size and interface of each of the data storage devices, wherein the receptacles are configured for receiving and communicably coupling to one of the data storage devices;
- clearing data on the data storage devices in the eradication queue using a server communicably coupled with the drive arrays, wherein the drive arrays are communicably coupled with the server via a drive array controller configured for facilitating communication between the drive arrays and the server; and
- creating log files including information about the eradication of each of the data storage devices cleared;
- creating a first configuration file for the drive array controller, the configuration file comprising a serial number and model of each of the drive arrays:
- creating a second configuration file using the serial numbers and model numbers of the first configuration file to access and store details of the data storage devices in each of the drive arrays;
- creating logical unit numbers (LUNs) or logical volumes on a placeholder disk in one of the receptacles of at least one of the drive arrays using information from at least one of the first and second configuration files, wherein the LUNs or logical volumes correspond with a physical location of the data storage devices within the drive arrays; and
- presenting the LUNs or logical volumes to the drive array controller for facilitating communication between the server and the data storage devices.

9. The method of claim 8, wherein the clearing of the data storage devices further comprises:
- receiving specification information regarding each of the drive arrays;
- receiving specification information regarding each of the data storage devices in the receptacles of the drive arrays;
- overwriting each of the data storage devices in the receptacles with zeros, ones, and random characters; and
- creating log files corresponding to each of the data storage devices and storing the log files in directories corresponding to each of the drive arrays, wherein each of the log files contain information corresponding to one of the data storage devices and each indicate if the erasure of the one of the data storage devices is complete or has failed.

10. The method of claim 8, wherein the step of sorting the data storage devices into the eradication queue and the destruction queue is based on value of reuse or resale of the data storage devices and on sensitivity of data contained on the data storage devices.

11. The method of claim 8, further comprising labeling the data storage devices, placing the data storage devices in locked and tagged containers, and transferring the locked and tagged containers to a secure, locked, and video-monitored room for sorting into the eradication queue and the destruction queue.

12. The method of claim 8, further comprising creating a master manifest of the data storage devices placed into the eradication queue and into the destruction queue and comparing the data storage devices of the destruction queue with the master manifest before the step of physically destroying the data storage devices of the destruction queue.

13. A non-transitory, physical computer-readable medium having a computer program stored thereon for operating an erasure system to simultaneously erase a plurality of data storage devices of one or more types physically and communicably coupled to one or more drive arrays, wherein the drive arrays are communicably coupled with a server via a drive array controller, the computer program comprising:
- code segments for retrieving, with the server, specification information regarding each of the drive arrays, wherein the specification information for the drive arrays includes a model and a serial number of each of the drive arrays connected to the drive array controller;
- code segments for retrieving, with the server, specification information regarding each of the data storage devices in the drive arrays, wherein the specification information for the data storage devices includes physical location within the drive arrays, serial number, and size;
- code segments for overwriting, with the server, each of the data storage devices with zeros, ones, and random characters;
- code segments for creating, with the server, log files corresponding to each of the data storage devices, wherein each of the log files contain information corresponding to at least one of the data storage devices and each indicate if the erasure of the data storage device is complete or has failed;
- code segments for storing, with the server, the log files in directories corresponding to each of the drive arrays and subdirectories corresponding to whether erasure of the data storage device is complete or has failed;
- code segments for creating a first configuration file for the drive array controller, the configuration file comprising a serial number and model of each of the drive arrays;
- code segments for creating a second configuration file using the serial numbers and model numbers of the first configuration file to access and store details of the data storage devices in each of the drive arrays;
- code segments for creating logical unit numbers (LUNs) or logical volumes on a placeholder disk in one of the receptacles of at least one of the drive arrays using information from at least one of the first and second configuration files, wherein the LUNs or logical volumes correspond with a physical location of the data storage devices within the drive arrays; and
- code segments for presenting the LUNs or logical volumes to the drive array controller for facilitating communication between the server and the data storage devices.

14. The non-transitory, physical computer-readable medium of claim 13, wherein the computer program further comprises code segments for creating a temporary scrub list of location shortcuts using Linux and UNIX commands and using the location shortcuts for writing to and reading of the physical data storage devices.

15. The non-transitory, physical computer-readable medium of claim 13, wherein the log files comprise serial number, size, time, date, and if the erasure of the data storage device is complete or has failed.

16. The non-transitory, physical computer-readable medium of claim 13, the computer program further comprising code segments for deleting the LUNs or logical volumes from the placeholder disk after overwriting the data storage devices.

\* \* \* \* \*